United States Patent [19]

Baker

[11] Patent Number: 4,527,406

[45] Date of Patent: Jul. 9, 1985

[54] LOCKING FUEL CAP

[75] Inventor: Steven F. Baker, Bellevue, Ohio

[73] Assignee: General Motors Corporation, Detroit, Mich.

[21] Appl. No.: 489,695

[22] Filed: Apr. 28, 1983

[51] Int. Cl.³ .............................................. B65D 55/14
[52] U.S. Cl. .................................... 70/165; 220/210; 70/221
[58] Field of Search .......................... 70/158, 163-173, 70/218-223; 220/203, 210, 288, 303

[56] References Cited

U.S. PATENT DOCUMENTS

| | | | |
|---|---|---|---|
| 4,000,633 | 1/1977 | Evans | 70/165 |
| 4,107,961 | 8/1978 | Evans | 70/165 |
| 4,132,091 | 1/1979 | Aro | 70/165 |
| 4,280,346 | 7/1981 | Evans | 70/165 |
| 4,280,347 | 7/1981 | Evans | 70/165 |
| 4,453,388 | 6/1984 | Baker | 70/165 |

*Primary Examiner*—Robert L. Wolfe
*Attorney, Agent, or Firm*—Donald F. Scherer

[57] ABSTRACT

A locking fuel cap has a lock bolt which is slidably disposed in the cap handle and responsive to a key-operated lock mechanism to selectively drivingly connect the cap handle to a ratchet ring. The ratchet ring is connected through a torque limiting drive to a threaded closure. When the fuel cap is unlocked, the lock bolt provides a positive drive in both opening and closing directions. If the fuel cap is locked, a spring finger on the lock bolt engages a pin on the lock mechanism when a predetermined torque is present at the ratchet ring during cap installation. The pin holds the lock bolt in a position preventing a drive connection with the ratchet ring thereafter when the cap is rotated in the opening direction.

1 Claim, 6 Drawing Figures

LOCKING FUEL CAP

This invention relates to fuel caps and more particularly to fuel caps having a key-operated locking mechanism.

It is an object of this invention to provide an improved key-operated locking fuel cap wherein the cap can be unlocked and then conditioned to be locked and the key removed prior to removal or installation of the fuel cap onto the fuel fill tube.

It is another object of this invention to provide an improved fuel cap wherein the installation torque completes the locking sequence such that the key can be removed from the lock prior to cap installation.

A further object of this invention is to provide an improved locking fuel cap having a handle and closure which are drive-connected by a lock bolt wherein a spring member is connected to the lock bolt in a position to operatively engage a portion of a key-controlled lock mechanism to prevent the lock bolt from drivingly connecting the handle with the closure when the locked condition is selected and a predetermined torque is reached upon cap installation regardless of whether or not the key remains in the lock mechanism.

These and other objects and advantages of the present invention will be more apparent from the following description and drawings in which.

Figure 1:
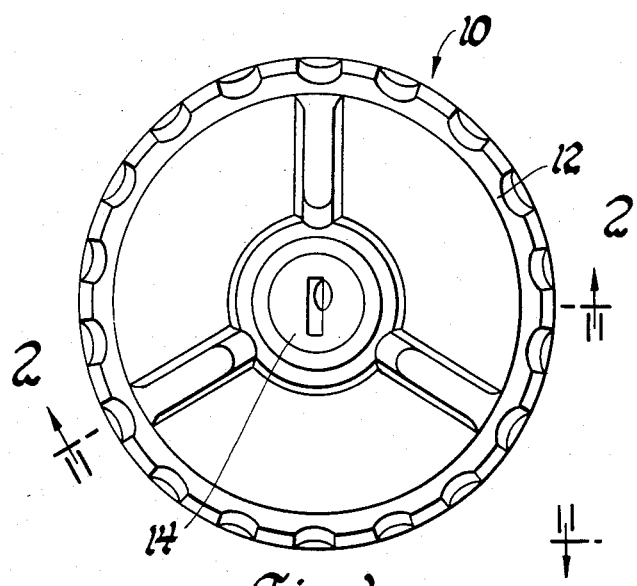
FIG. 1 is a top view of a locking fuel cap.
Figure 2:
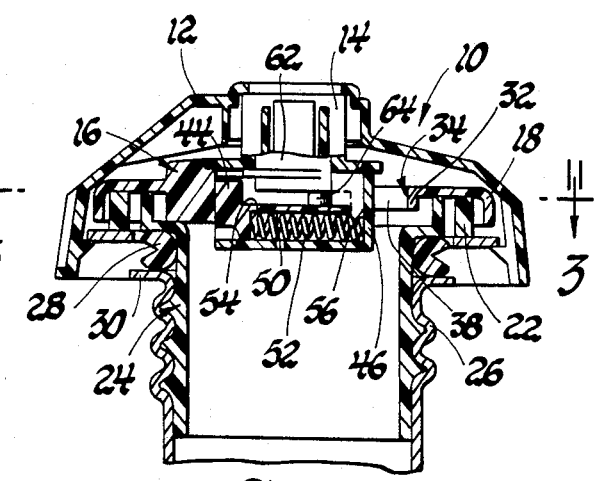
FIG. 2 is a sectional view taken along line 2—2 of FIG. 1.
Figure 3:
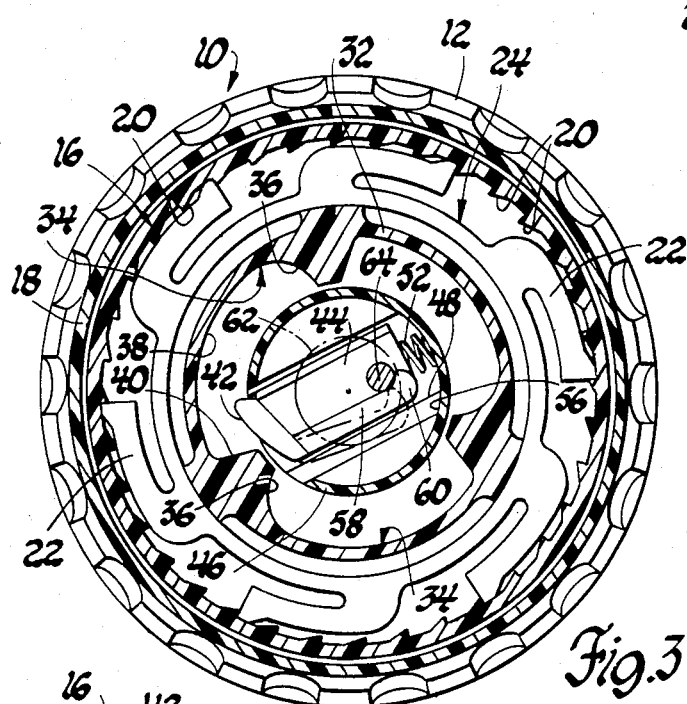
FIG. 3 is a sectional view taken along line 3—3 of FIG. 2.

Referring to the drawings, wherein like characters represent the same or corresponding parts throughout the several views, there is seen in FIGS. 1 and 2 a locking fuel cap, generally designated 10, having a handle or cover 12. A lock mechanism 14 is secured in the handle 12. A ratchet ring 16 is rotatably disposed in the handle 12 and includes an outer cylindrical portion 18 which, as seen in FIG. 3, has formed therein a plurality of ratchet teeth 20. The cylindrical portion 18 surrounds a plurality of torque arms 22 which are formed on and extend peripherally outward from a threaded closure portion 24. The torque arms 22 are adapted to engage the ratchet teeth 20 such that rotation of the ratchet ring in a clockwise direction will provide a limited torque connection between the ratchet ring and the torque arms while rotation in the opposite direction will provide a positive drive connection between the ratchet ring and the torque arms.

As seen in FIG. 2, the threaded closure 24 is adapted to threadably engage a fuel fill tube 26 such that closure of the fuel fill tube can be attained. A seal ring 28 is disposed on the threaded closure 24 in a position to sealingly engage a lip 30 formed on the fill tube 26, thus preventing direct leakage of vapors to the atmosphere from the fuel tank.

Figure 4:
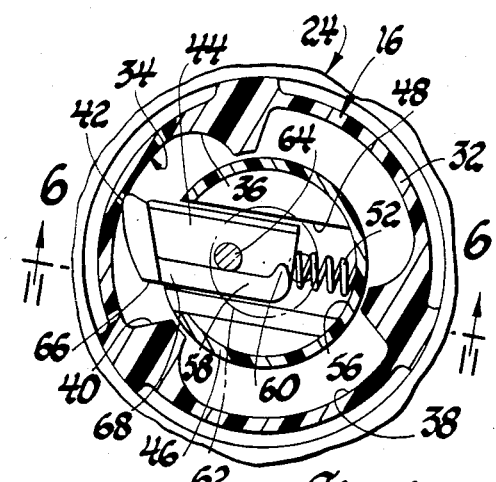
FIG. 4 is a portion of the mechanism shown in FIG. 3 with the cap in the unlocked condition.

The ratchet ring 16 has a cylindrical inner portion 32 in which is formed a plurality of cam races 34. As seen in FIGS. 3 and 4, each cam race 34 has a radially inwardly curved section 36, a circumferential section 38 and an essentially flat radially extending surface 40. The cam race 34 is contacted, as seen in FIG. 4, by a cam follower surface 42 which is formed on a lock bolt 44. The lock bolt 44 is a component of the lock mechanism 14.

The lock mechanism 14 has a housing portion 46 in which is formed a slot 48 which slidably contains the lock bolt 44. The lock bolt 44 includes a spring pocket 50 in which is disposed a compression spring 52 which is compressed between one end 54 of pocket 50 and an inner surface 56 of housing 46.

The spring 52, as seen in FIGS. 2 and 4, urges the cam follower surface 42 toward abutment with the cam race 34. The lock bolt 44 has integrally formed thereon a finger or leaf spring portion 58 which includes a latch end 60.

The lock mechanism 14 also includes a key-controlled lock cylinder 62 which includes a lock pin 64. As seen in FIGS. 3 and 4, the lock pin 64 is movable from the unlocked position, shown in FIG. 4, to the locked position shown in FIG. 3. This positional change of lock pin 64 is attained through the use of a key in a well-known manner. As seen in FIG. 4, when the lock cylinder 62 is unlocked, the spring 52 will urge the lock bolt 44 transversely of the cap such that contact between cam race 34 and cam follower surface 42 is present. If, under this condition, the handle 12 is rotated in the installation direction (clockwise in FIG. 4) the cam follower surface 42 will contact the curved portion 36 resulting in transverse movement of the lock bolt 44 against spring 52. The curved surface 36 is designed such that the amount of transverse movement of lock bolt 44 is limited. Thus, a positive drive connection between lock bolt 44 and curved surface 36 and therefore ratchet ring 16 will be present. Therefore, installation of the fuel cap can be accomplished.

If the handle 12 is rotated in the opposite direction, the lock bolt 44 has a flat longitudinal surface 66 which will abut the surface 40 such that a positive drive connection between the handle 12 and the ratchet ring 16 will occur. Thus, when the fuel cap is unlocked, a positive drive connection is provided in both the installation and removal direction.

Figure 5:
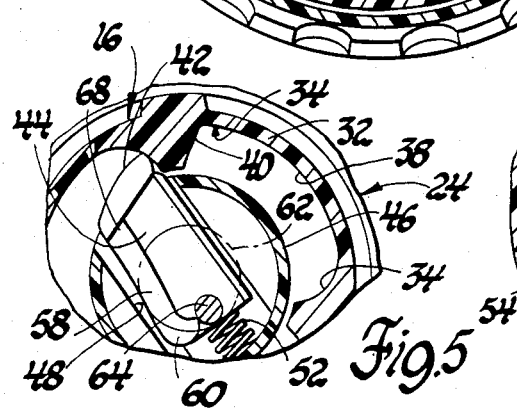
FIG. 5 shows a portion of the structure of FIG. 3 with the handle being operated to a locking condition.
Figure 6:
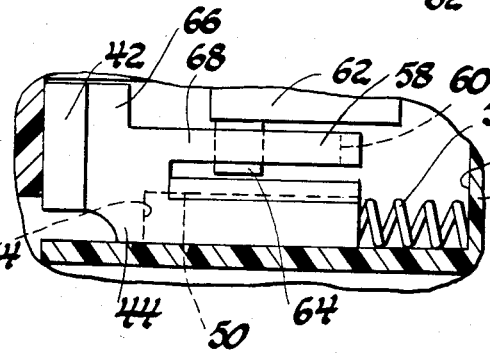
FIG. 6 is a view taken along line 6—6 of FIG. 4.

When the fuel cap is locked, the lock pin 64 is disposed in the position shown in FIGS. 3 and 5. After the pin 64 is placed in this position, the key can be removed from the lock cylinder 62. When the fuel cap is locked and the handle 12 is rotated in the installation direction, the lock bolt 44 will be forced transversely against spring 52 as shown in FIG. 5. During this movement, the latch end 60 of leaf spring 58 will come into contact with the lock pin 64 resulting in displacement of the leaf spring 58 radially about the end 68 thereof, as seen in FIG. 5. Upon a predetermined installation torque, the latch end 60 will snap over the lock pin 64 and be retained in the position shown in FIG. 3.

As seen in FIG. 3, when the lock bolt 44 is maintained radially inward by the leaf spring 58, the flat longitudinal surface 66 will not engage surface 40. Thus, a positive drive connection between the handle 12 and ratchet ring 16 cannot be established in the cap removal direction. The cam follower surface 42 will engage the inner surface of portion 32. However, this will result in ratcheting of the lock bolt 44 and no significant drive force will be established. The lock bolt, however, will continue to engage the curved surface 36 of cam race 34 such that a positive drive connection in the cap installation direction is available, even when the cap is locked.

Unlocking of the cap will return lock pin 64 to the position shown in FIG. 4 thereby releasing the lock bolt 44.

From the above description, it will be apparent that the operating key need not be retained in the lock mechanism during cap installation or removal. Thus, it is less likely that the operator will forget to remove the key. If the fuel cap key is maintained on a key ring with numerous other keys, the likelihood of scratching the vehicle body surface during cap installation or removal is greatly reduced since the keys will not be in a position to contact such surface. Very few prior art fuel caps will permit similar operation. Those that do permit such manipulations, do not provide the simplicity of structure which is available with the present invention.

The embodiments of the invention in which an exclusive property or privilege is claimed are defined as follows:

1. An improvement in key operated torque limited locking fuel caps for use in closing a fuel fill tube having a cap handle, a cap closure, a ratchet ring operatively connected to the closure, and a lock and key mechanism mounted in the fuel cap including a lock cylinder wherein when the lock cylinder is conditioned to the locking mode, the key can be removed from the lock cylinder prior to removal or installation of the fuel cap onto the fill tube, said fuel cap being torque limited in the closing direction and the lock mechanism providing a positive drive connection between the cap handle and ratchet ring in the opening direction when unlocked and a slipping connection therebetween in the opening direction when locked, wherein the improvement comprises an arcuate cam race formed on the ratchet ring, a spring biased transversely movable lock bolt drivingly connected to the cap handle and including cam follower means engageable with said cam race to provide a positive drive connection between said cap handle and said ratchet ring in both directions of rotation when the lock mechanism is unlocked, and spring finger means having one end integral with said lock bolt and the other end having a latch portion engageable with a portion of the lock cylinder to maintain the lock bolt in a position to interrupt the drive connection in the opening direction thus preventing unauthorized cap removal, said lock bolt being movable transversely of the cap by said cam race in the cap closing direction to enforce engagement of the latch portion of said spring finger with said lock cylinder only when said lock mechanism is locked, said cam race being designed to always establish a positive drive with the lock bolt in the closing direction.

* * * * *